(12) United States Patent
Kreutz et al.

(10) Patent No.: US 9,879,696 B2
(45) Date of Patent: Jan. 30, 2018

(54) ELECTRIC FLUID PUMP HAVING A COOLED WET SECTION

(75) Inventors: Detlef Kreutz, Villmar (DE); Peter Koeppler, Bad Vilbel (DE)

(73) Assignee: Continental Automotive GmbH, Hannover (DE)

( * ) Notice: Subject to any disclaimer, the term of this patent is extended or adjusted under 35 U.S.C. 154(b) by 318 days.

(21) Appl. No.: 13/981,060

(22) PCT Filed: Jan. 17, 2012

(86) PCT No.: PCT/EP2012/050600
§ 371 (c)(1),
(2), (4) Date: Jul. 22, 2013

(87) PCT Pub. No.: WO2012/098093
PCT Pub. Date: Jul. 26, 2012

(65) Prior Publication Data
US 2013/0302186 A1   Nov. 14, 2013

(30) Foreign Application Priority Data
Jan. 21, 2011   (DE) .................. 10 2011 009 192

(51) Int. Cl.
| F04D 29/00 | (2006.01) |
| F04D 29/58 | (2006.01) |
| H02K 9/04 | (2006.01) |
| F04D 13/06 | (2006.01) |
| H02K 1/32 | (2006.01) |
| H02K 5/128 | (2006.01) |

(52) U.S. Cl.
CPC ......... *F04D 29/588* (2013.01); *F04D 13/064* (2013.01); *F04D 13/0606* (2013.01); *H02K 1/32* (2013.01); *H02K 9/04* (2013.01); *H02K 5/128* (2013.01)

(58) Field of Classification Search
CPC ............ F04D 13/0653; F04D 13/0646; F04D 13/0606; F04D 29/588; H02K 9/04; H02K 9/02
USPC ................................................. 310/61, 62, 63
See application file for complete search history.

(56) References Cited

U.S. PATENT DOCUMENTS

| 249,495 | A | * | 11/1881 | Hefner-Alteneck | ... H02K 15/12 310/265 |
| 406,777 | A | * | 7/1889 | Schmid | ..................... H02K 3/24 310/61 |

(Continued)

FOREIGN PATENT DOCUMENTS

| AT | 502 338 A1 | 3/2007 |
| CN | 201065842 | 5/2008 |

(Continued)

OTHER PUBLICATIONS

Office Action dated Dec. 2, 2015 which issued in the corresponding Chinese Patent Application No. 2012800057297.

*Primary Examiner* — Charles Freay
*Assistant Examiner* — Christopher Bobish
(74) *Attorney, Agent, or Firm* — Cozen O'Connor

(57) ABSTRACT

An electric fluid pump having a rotor. The rotor of the pump is provided with elements that produce an at least partially axially directed fluid flow in the wet section of the pump during rotation of the rotor. This fluid flow serves to cool components of the pump that are arranged in or on the wet section.

7 Claims, 2 Drawing Sheets

(56) References Cited

U.S. PATENT DOCUMENTS

| | | | | |
|---|---|---|---|---|
| 408,265 | A | * | 8/1889 | Short .................... H01R 39/04 |
| | | | | 310/227 |
| 668,194 | A | * | 2/1901 | Lamme ................. H02K 21/10 |
| | | | | 310/216.066 |
| 2,891,391 | A | * | 6/1959 | Grant et al. .................... 62/475 |
| 2,925,041 | A | | 2/1960 | Miroslav |
| 3,315,604 | A | * | 4/1967 | Roeske ......................... 417/201 |
| 3,348,490 | A | * | 10/1967 | Katz et al. .................... 417/356 |
| 5,165,868 | A | | 11/1992 | Gergets et al. |
| 5,248,245 | A | | 9/1993 | Behnke et al. |
| 5,692,886 | A | | 12/1997 | Kobayashi et al. |
| 5,997,261 | A | | 12/1999 | Kershaw et al. |
| 2007/0257571 | A1 | | 11/2007 | Hong et al. |

FOREIGN PATENT DOCUMENTS

| | | |
|---|---|---|
| DE | 33 24 076 A1 | 9/1984 |
| DE | 698 04 745 T2 | 11/2002 |
| DE | 203 16 535 U1 | 12/2003 |
| EP | 0 657 653 A1 | 6/1995 |
| FR | 1091514 A | 4/1955 |
| GB | 1106478 A | 3/1968 |

\* cited by examiner

ELECTRIC FLUID PUMP HAVING A COOLED WET SECTION

CROSS REFERENCE TO RELATED APPLICATIONS

This is a U.S. national stage of application No. PCT/EP2012/050600, filed on Jan. 17, 2012. Priority is claimed on German Application No.: DE102011009192.0 filed Jan. 21, 2011, the content of which is incorporated here by reference.

BACKGROUND OF THE INVENTION

1. Field of the Invention

The present invention relates to an electric fluid pump having a pump shaft with an axis, an electric pump drive designed as a wet section, a rotor arranged on the pump shaft, and a stator surrounding said rotor across an annular gap.

2. Description of Prior Art

Fluid pumps, liquid pumps, are used, for example, as cooling liquid pumps, lubricant pumps, etc. in motor vehicles, in particular as water pumps, oil pumps, and the like.

In many cases, there is a desire to cool the wet section, which is the pump drive, of such fluid pumps in order to keep electric or electronic components arranged there to as low a temperature as possible. For this purpose, an embodiment in which a drilled shaft provides a restricted short-circuit between the wet section, connected to the pressure at the bladed impeller outlet, and the suction side of the pump has been designed, for example. However, the disadvantages here are the relatively high costs and a reduction in the efficiency of the pump.

SUMMARY OF THE INVENTION

It is an object of the present invention to provide an electric fluid pump of the type described at the outset which, by simple design, ensures particularly good cooling of the wet section (pump drive).

According to one embodiment of the invention, this object is achieved, in an electric fluid pump of the type stated, by virtue of the fact that the rotor is provided with elements that, during rotary operation thereof, produce an at least partially axially directed fluid flow in the wet section of the pump drive.

According to one embodiment the invention, provision is made for a forced flow through the wet section between the rotor and the stator of an electric fluid pump. By the forced fluid flow, a cooling effect is generated, by which components arranged in or on the wet section, e.g. an electronic unit thermally coupled to this section, can be cooled.

In a particularly preferred embodiment of the invention, the elements are formed by at least one cavity in the rotor and openings for the cavity on the two rotor ends, wherein an opening on one end is preferably situated radially further out than an opening on the opposite end. In this case, the fluid pressure distribution in the cavity of the rotating rotor ensures that the fluid flows in through the opening arranged radially on the inside and flows out through the opening arranged radially on the outside. This produces a fluid flow direction through the rotor cavity and, in conjunction with the annular gap between the rotor and the stator, leads overall to an annular fluid flow in the wet section of the pump drive.

According to one embodiment of the invention, a flow through the wet section of an electric fluid pump is thus simply produced, and hence cooling of components in/on the wet section, e.g. an electronic unit thermally coupled to this section, is made possible in a simple and economical manner.

Specifically, the openings for the rotor cavity are formed by holes in the rotor end walls on both ends of the rotor. The at least one cavity of the rotor is therefore preferably covered, at both end faces of the rotor, by end walls (suitable plates), in which the holes are provided. The two end walls are differentiated by the fact that, on one end wall, at least one hole is provided, which is arranged radially further out than the at least one hole provided on the opposite end wall. A plurality of openings or holes is preferably provided on each end wall, and said openings or holes can be arranged at equal circumferential spacings, for example. A suitable number of holes per end wall is three.

The rotor can have one or more cavities in the interior thereof. The cavities can be formed separately or can be connected to one another. In one embodiment the rotor has a cylindrical shape and has a multiplicity of cavities, which are arranged at circumferential spacings and are separated from one another by webs, each provided with an opening at one end. In this embodiment, there is therefore a flow of fluid through each cavity since, for each cavity, a corresponding forced flow is obtained through the different radial arrangement of the openings of the ends.

In one embodiment, the rotor can have cavities that are approximately triangular in cross section separated from one another by spoke-shaped webs. The corresponding spoke-shaped webs ensure the required stability of the rotor, while the cavities ensure the desired forced flow effect.

According to one embodiment of the invention a forced fluid flow is preferably produced an annular flow which passes through the at least one cavity in the rotor, a radially outer opening, the annular gap between the rotor and the stator and a radially inner opening. This annular flow ensures that there is sufficient fluid circulation in the wet section and hence ensures the desired cooling effect. During this process, an exchange with the main fluid flow of the electric fluid pump can take place, thereby further intensifying the cooling effect.

The wet section of the pump drive is preferably bounded by a can, which extends between the rotor and the stator and surrounds the rotor. The gap formed between the rotor and the stator, through which the fluid circulation takes place, is therefore located between the can and the rotor in this embodiment. In particular, a can of this kind is of pot-shaped design and extends around the rotor, together with the shaft and the bearing, into the impeller (bladed impeller) region, where connection to the fluid flow of the pumped fluid takes place, e.g. to the spiral casing of the pump.

The can can be connected to the stator or to the pump casing or the spiral casing but can also be designed as an individual part pushed into the stator, after which the rotor is pushed into the can.

The can thus surrounds the wet section, wherein the fluid circulation achieved according to one embodiment of the invention takes place within the can.

As already mentioned, cooling of components arranged in or on the wet section is achieved by the fluid circulation achieved according to the invention in the wet section. This applies, in particular, to components arranged on the side of the rotor facing away from the impeller (bladed impeller) and make contact with or are arranged adjacent to the part of the wet section, which is situated in the region of this end of the rotor. The heat discharged by the corresponding components in this section is transmitted to the fluid in the wet section and is removed from this section by the fluid circulation brought about according to one embodiment of the invention. By the fluid circulation, a corresponding cooling effect is produced. The heated fluid enters the wet section at a position adjacent to the bladed impeller, where an exchange with the main fluid flow of the pump can take place, further intensifying the cooling effect.

BRIEF DESCRIPTION OF THE DRAWINGS

The invention is explained in detail below by means of an illustrative embodiment in conjunction with the drawing, in which.

DETAILED DESCRIPTION OF THE PRESENTLY PREFERRED EMBODIMENTS

Figure 1:
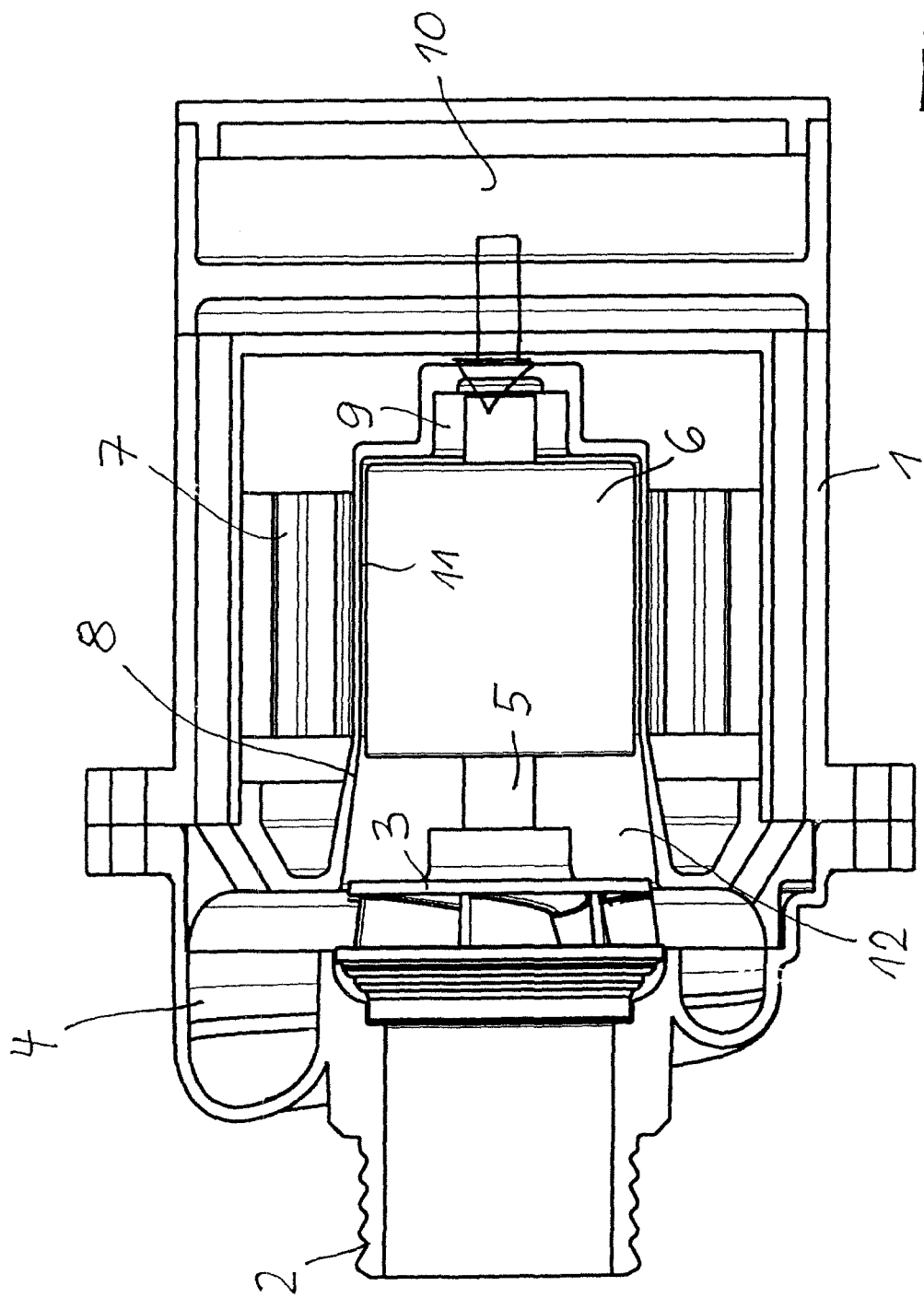
FIG. 1 is a longitudinal section through an embodiment of a fluid pump.

The fluid pump shown in the figures is a fluid pump of a motor vehicle of a conventional type. The relevant parts which do not have any essential significance for the invention are explained only briefly here. The pump has an inlet 2 and a pumping region with a spiral casing 4 and a bladed impeller 3 arranged on a drive shaft 5. The pump drive of the electric pump has a stator 7 of annular design and a rotor 6, which is arranged in the stator 7 and is disposed on the drive shaft 5. A bearing for the shaft 5 is shown at 9. In the part of the pump on the right in the figure there is an electronic unit 10 (shown schematically). All the parts are accommodated in a suitable pump casing 1.

The rotor 6 is located in a can 8, which is of pot-shaped design and extends from the bladed impeller region or spiral casing 4 through the gap 11 between the stator 7 and the rotor 6 and surrounds the rotor 6 at the end, on the right in the figure. Can 8 encloses a wet section 12 connected to the fluid flow in the spiral casing 4. The wet section 12, which is indicated at 12 in FIG. 1, is therefore filled with the fluid to be delivered.

Normally, the fluid in the wet section 12 is in a relatively immobile state while the pump is in operation and the rotor 6 is rotating. According to one embodiment of the invention the rotor 6 is designed in such a way that fluid circulation is achieved in the wet section 12 during the operation of the pump as the rotor 6 rotates, by which circulation the heat transferred to the fluid in the wet section 12, e.g. from an electronic module 10, is carried away from right to left in the axial direction in the figure and can be fed into the main fluid flow of the electric pump. A possible thermal coupling of the electronic unit 10 to the wet section 12 for heat dissipation is indicated schematically in FIG. 1 by the arrow shown.

Figure 2:
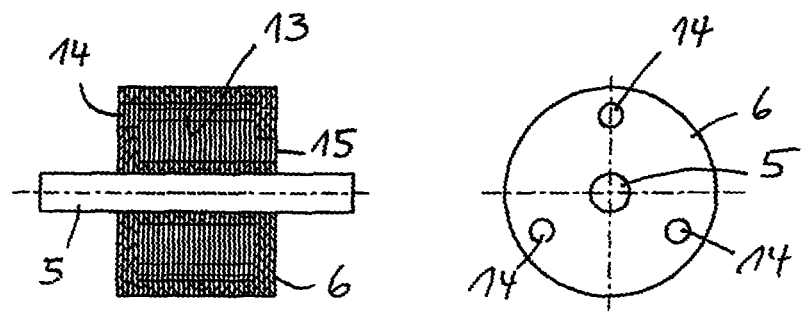
FIG. 2 is a detail of the rotor of the fluid pump in FIG. 1, wherein the rotor is shown in longitudinal section in the left-hand illustration and the rotor is shown in a view from the left in the right hand illustration.

To achieve the desired fluid circulation, the rotor 6 has in the interior thereof a cavity 13 shown in FIG. 2, which is connected by suitable holes 14, 15 on both ends of the rotor 6 to the wet section 12 surrounding the rotor 6. There are three holes 14, 15 arranged on each end, wherein the holes 14 on the end on the left in the figure are arranged radially further out than the holes 15 on the end which is on the right in the figure. Here, the fluid pressure distribution in the cavity 13 of the rotating rotor 6 ensures that the fluid flows in through the openings 15 arranged radially on the inside and flows out through the openings 14 arranged radially on the outside. This produces a fluid flow through the rotor 6 from right to left in a substantially axial direction in FIG. 2 and, in conjunction with the annular gap between the rotor 6 and the stator 7 (between the rotor 6 and the can), leads overall to an annular fluid flow (fluid circulation) in the wet section 12 of the pump drive.

According to the figures, the fluid heated by the electronic unit 10 and situated in the wet section 12 can therefore flow into the cavity 13 through the openings 15 of the rotor 6, flow axially through the cavity 13 and emerge from the rotor 6 out of the openings 14 arranged radially further out and release the thermal energy in the corresponding wet section 12. The fluid can then pass through the gap 11 between the rotor 6 and the can 8 in the opposite axial direction and reenter in the other end region of the rotor 6. In this way, fluid circulation is simply achieved in the wet section 12, allowing relevant modules to be cooled.

Figure 3:
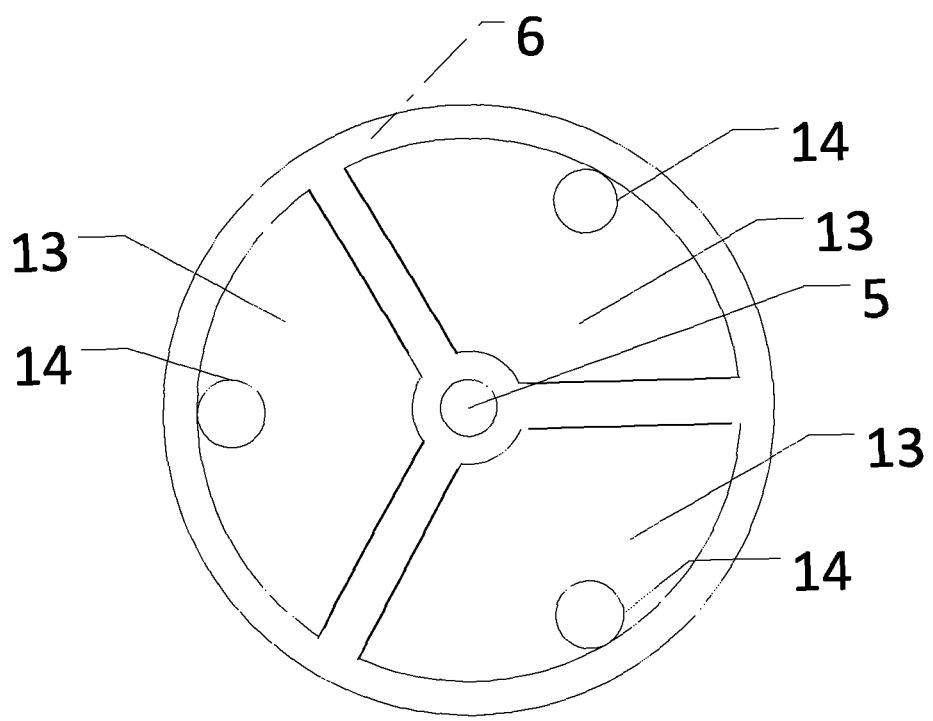
FIG. 3 is a cross section of the rotor 6 shown in FIG. 2.

FIG. 3 shows a radial cross section of the rotor 6. The cavities 13 are approximately triangular in cross section and separated from one another by spoke-shaped webs.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An electric fluid pump comprising:
a pump shaft having a longitudinal axis;
an electric pump drive having a wet section configured to drive the pump shaft;
a rotor arranged on the pump shaft having a plurality of cavities that are arranged with a circumferential spacing allowing an axial flow through the rotor that during rotary operation of the rotor, produces an at least partially axially directed fluid flow in the wet section of the electric pump drive; and
a stator surrounding the rotor across an annular gap,
wherein openings for the plurality of cavities are formed on each axial rotor end,
wherein an opening on one axial rotor end configured as a fluid output is situated radially further out than an opening on an opposite axial rotor end configured as a fluid input,
wherein each of the plurality of cavities are substantially triangular in radial cross section and are separated from one another by spoke-shaped webs,
wherein each of the plurality of cavities is delimited by an outer rotor wall, an inner wall proximate to the pump shaft, respective spoke-shaped webs, and the respective rotor ends,
wherein a radial cavity dimension measured between the outer rotor wall and the inner wall proximate to the pump shaft is substantially constant along an axial length and greater than a diameter of the openings for the plurality of cavities on each axial rotor end.

2. The electric fluid pump as claimed in claim 1, wherein the openings are holes in axial end walls of the rotor.

3. The electric fluid pump as claimed in claim 1, further comprising a module to be cooled by the wet section.

4. The electric fluid pump as claimed in one of claim 1, wherein the at least partially axially directed fluid flow is designed as an annular flow that passes through:
- the at least one rotor cavity,
- a radially outer opening,
- the annular gap between the rotor and the stator; and
- a radially inner opening.

5. The electric fluid pump as claimed in claim 1, wherein the wet section of the electric pump drive is bounded by a can that extends between the rotor and the stator and surrounds the rotor.

6. The electric fluid pump as claimed in claim 3, wherein the module to be cooled is an electric/electronic module.

7. The electric fluid pump as claimed in claim 1, wherein the radial cavity dimension of the plurality of cavities is greater than a radial dimension of the fluid input and the fluid output.

* * * * *